(12) United States Patent
Vinton et al.

(10) Patent No.: US 12,548,579 B2
(45) Date of Patent: Feb. 10, 2026

(54) METHOD AND APPARATUS FOR PROCESSING OF AUDIO USING A NEURAL NETWORK

(71) Applicant: DOLBY LABORATORIES LICENSING CORPORATION, San Francisco, CA (US)

(72) Inventors: Mark S. Vinton, Alameda, CA (US); Cong Zhou, Foster City, CA (US); Roy M. Fejgin, San Francisco, CA (US); Grant A. Davidson, Burlingame, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 6 days.

(21) Appl. No.: 18/031,790

(22) PCT Filed: Oct. 14, 2021

(86) PCT No.: PCT/US2021/055090
§ 371 (c)(1),
(2) Date: Apr. 13, 2023

(87) PCT Pub. No.: WO2022/081915
PCT Pub. Date: Apr. 21, 2022

(65) Prior Publication Data
US 2023/0395086 A1    Dec. 7, 2023

Related U.S. Application Data

(60) Provisional application No. 63/092,118, filed on Oct. 15, 2020.

(30) Foreign Application Priority Data

Dec. 1, 2020    (EP) .................................... 20210968

(51) Int. Cl.
*G10L 19/032*  (2013.01)
*G10L 19/06*   (2013.01)

(52) U.S. Cl.
CPC ............ *G10L 19/032* (2013.01); *G10L 19/06* (2013.01)

(58) Field of Classification Search
CPC ............................. G10L 19/032; G10L 19/06
See application file for complete search history.

(56) References Cited

U.S. PATENT DOCUMENTS 5,473,631 A    12/1995 Moses
7,742,612 B2    6/2010 Fröhlich
(Continued)

FOREIGN PATENT DOCUMENTS

JP    H0317700 A    1/1991
JP    2011509426 A    3/2011
(Continued)

OTHER PUBLICATIONS

Al-Nuaimi A Y H et al, "Enhancing MP3 Encoding by utilizing a predictive Complex-Valued Neural Network", Neural Networks (IJCNN), The 2012 International Joint Conference on, IEEE, Jun. 10, 2012, pp. 1-6, 6 pages.
(Continued)

*Primary Examiner* — Olujimi A Adesanya
*Assistant Examiner* — Ethan Daniel Kim

(57) ABSTRACT

Described herein is a method of processing an audio signal using a neural network or using a first and a second neural network. Described is further a method of training said neural network or of jointly training a set of said first and said second neural network. Moreover, described is a method of obtaining and transmitting a latent feature space representation of a perceptual domain audio signal using a neural network and a method of obtaining an audio signal (Continued)

from a latent feature space representation of a perceptual domain audio signal using a neural network. Described are also respective apparatuses and computer program products.

22 Claims, 13 Drawing Sheets

(56) References Cited

U.S. PATENT DOCUMENTS

| | | | |
|---|---|---|---|
| 8,484,022 | B1 | 7/2013 | Vanhoucke |
| 2012/0023051 | A1 | 1/2012 | Pishehvar |
| 2015/0124999 | A1* | 5/2015 | Ren .......................... H03G 3/00 381/98 |
| 2018/0160984 | A1 | 6/2018 | Mauger |
| 2019/0164052 | A1 | 5/2019 | Sung |
| 2020/0176004 | A1 | 6/2020 | Kleijn |
| 2020/0234720 | A1* | 7/2020 | Sung ..................... G10L 21/038 |
| 2020/0234725 | A1 | 7/2020 | Garbacea |
| 2020/0395035 | A1* | 12/2020 | Kolter .................... G10L 15/01 |
| 2021/0233547 | A1* | 7/2021 | Lee ......................... G10L 19/00 |
| 2022/0415334 | A1 | 12/2022 | Davidson |

FOREIGN PATENT DOCUMENTS

| | | |
|---|---|---|
| JP | 2019512739 A | 5/2019 |
| WO | 2019199995 A1 | 10/2019 |
| WO | 2020023585 A1 | 1/2020 |
| WO | 2020041363 A1 | 2/2020 |
| WO | 2020171034 A1 | 8/2020 |

OTHER PUBLICATIONS

Avramov, V. et al. "Sound Signal Invariant DAE Neural Network-Based Quantizer Sound Signal Invariant DAE Neural Network-Based Quantizer Architecture of Audio/Speech Coder Using the Matching Pursuit Algorithm" 15th International Symposium on Neural Networks, pp. 511-520, 10 pages, May 2018.

Baumgarte, F. et al. "A Nonlinear Psychoacoustic Model Applied to the ISO MPEG Layer 3 Coder," AES Convention, New York, Oct. 1995, pp. 1-16, 16 pages.

Do-Hui Teh et al., "A neural network based perceptual audio coder", TENCON '94. IEEE Region 10'S Ninth Annual International Conference. Theme: Frontiers of Computer Technology. Proceedings of 1994 Singapore Aug. 22-26, 1994, New York, NY, USA, IEEE, pp. 913-917, 6 pages.

ISO/IEC 14496-3:2001(E), "Information technology—Coding of Audio-Visual Objects—Part 3: Audio," Subpart 4: General Audio Coding (GA)—AAC, TwinVQ, BSAC, 2001, pp. 1-344, 344 pages.

* cited by examiner

METHOD AND APPARATUS FOR PROCESSING OF AUDIO USING A NEURAL NETWORK

CROSS-REFERENCE TO RELATED APPLICATIONS

This application is a U.S. National Phase entry of International Application No. PCT/US2021/055090, filed Oct. 14, 2021, which claims priority of the following priority applications: U.S. provisional application 63/092,118, filed Oct. 15, 2020, and European patent application 20210968.2, filed on Dec. 1, 2020, each of which is hereby incorporated by reference in its entirety.

TECHNOLOGY

The present disclosure relates generally to a method of processing an audio signal using a neural network or using a first and a second neural network, and in particular to a method of processing an audio signal in a perceptual domain using a neural network or using a first and a second neural network. The present disclosure further relates to a method of training said neural network or of jointly training a set of said first and said second neural network. The present disclosure moreover relates to a method of obtaining and transmitting a latent feature space representation of a perceptual domain audio signal using a neural network and to a method of obtaining an audio signal from a latent feature space representation of a perceptual domain audio signal using a neural network. The present disclosure also relates to respective apparatuses and computer program products.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

High performance audio encoders and decoders take advantage of the limitations of the human auditory system to remove irrelevant information that humans cannot hear. Typically encoding systems use psychoacoustic or perceptual models to compute the respective masking threshold. The masking threshold is then used to control the coding process such that the noise introduced has minimal audible impact.

Up to now, neural networks have shown promise in many applications including encoding and/or decoding of images, videos and even speech. However, there is still an existing need for the application of neural networks in general audio encoding and/or audio decoding applications using typical training techniques, and in particular in encoding and/or decoding applications that involve perceptual domain audio signals.

SUMMARY

In accordance with a first aspect of the present disclosure there is provided a method of processing an audio signal using a neural network. The method may include the step of (a) obtaining a perceptual domain audio signal. The method may further include the step of (b) inputting the perceptual domain audio signal into the neural network for processing the perceptual domain audio signal. The method may further include the step of (c) obtaining, as an output from the neural network, a processed perceptual domain audio signal. And the method may include the step of (d) converting the processed perceptual domain audio signal to an original signal domain based on a mask indicating masking thresholds derived from a psychoacoustic model.

In some embodiments, processing the perceptual domain audio signal by the neural network may be performed in a time domain.

In some embodiments, the method may further include, before step (d), converting the audio signal to a frequency domain.

In some embodiments, the neural network may be conditioned on information indicative of the mask.

In some embodiments, the neural network may be conditioned on the perceptual domain audio signal.

In some embodiments, processing the perceptual domain audio signal by the neural network may include predicting the processed perceptual domain audio signal across time.

In some embodiments, processing the perceptual domain audio signal by the neural network may include predicting the processed perceptual domain audio signal across frequency.

In some embodiments, processing the perceptual domain audio signal by the neural network may include predicting the processed perceptual domain audio signal across time and frequency.

In some embodiments, the perceptual domain audio signal may be obtained from: (a) converting an audio signal from the original signal domain to the perceptual domain by applying the mask; (b) encoding the perceptual domain audio signal; and (c) decoding the perceptual domain audio signal.

In some embodiments, quantization may be applied to the perceptual domain audio signal prior to encoding and inverse quantization may be applied to the perceptual domain audio signal after decoding.

In accordance with a second aspect of the present disclosure there is provided a method of processing an audio signal using a first and a second neural network. The method may include the step of (a) obtaining, by a first apparatus, a perceptual domain audio signal by applying to an audio signal in an original signal domain a mask indicative of masking thresholds derived from a psychoacoustic model. The method may further include the step of (b) inputting the perceptual domain audio signal into the first neural network for mapping the perceptual domain audio signal to a latent feature space representation. The method may further include the step of (c) obtaining, as an output from the first neural network, the latent feature space representation. The method may further include the step of (d) transmitting the latent feature space representation of the perceptual domain audio signal and the mask to a second apparatus. The method may further include the step of (e) receiving, by the second apparatus, the latent feature space representation of the perceptual domain audio signal and the mask. The method may further include the step of (f) inputting the latent feature space representation into the second neural network for generating an approximated perceptual domain audio signal. The method may further include the step of (g) obtaining, as an output from the second neural network, the approximated perceptual domain audio signal. And the method may include the step of (h) converting the approximated perceptual domain audio signal to the original signal domain based on the mask.

In some embodiments, the method may further include encoding the latent feature space representation of the perceptual domain audio signal and the mask into a bitstream and transmitting the bitstream to the second apparatus, wherein the method may further include receiving the bitstream by the second apparatus and decoding the bitstream to obtain the latent feature space representation of the perceptual domain audio signal and the mask.

In some embodiments, the latent feature space representation of the perceptual domain audio signal and the mask may be quantized before encoding into the bitstream and dequantized before processing by the second neural network.

In some embodiments, the second neural network may be conditioned on the latent feature space representation of the perceptual domain audio signal and/or the mask.

In some embodiments, mapping the perceptual domain audio signal to the latent feature space representation by the first neural network and generating the approximated perceptual domain audio signal by the second neural network may be performed in a time domain.

In some embodiments, obtaining the perceptual domain signal in step (a), and converting the approximated perceptual domain signal in step (h) may be performed in a frequency domain.

In accordance with a third aspect of the present disclosure there is provided a method of jointly training a set of a first and a second neural network. The method may include the step of (a) inputting a perceptual domain audio training signal into the first neural network for mapping the perceptual domain audio training signal to a latent feature space representation. The method may further include the step of (b) obtaining, as an output from the first neural network, the latent feature space representation of the perceptual domain audio training signal. The method may further include the step of (c) inputting the latent feature space representation of the perceptual domain audio training signal into the second neural network for generating an approximated perceptual domain audio training signal. The method may further include the step of (d) obtaining, as an output from the second neural network, the approximated perceptual domain audio training signal. And the method may include the step of (e) iteratively tuning the parameters of the first and the second neural network based on a difference between the approximated perceptual domain audio training signal and an original perceptual domain audio signal.

In some embodiments, the first and the second neural network may be trained in the perceptual domain based on one or more loss functions.

In some embodiments, the first and the second neural network may be trained in the perceptual domain based on a negative log likelihood condition.

In accordance with a fourth aspect of the present disclosure there is provided a method of training a neural network. The method may include the step of (a) inputting a perceptual domain audio training signal into the neural network for processing the perceptual domain audio training signal. The method may further include the step of (b) obtaining, as an output from the neural network, a processed perceptual domain audio training signal. And the method may include the step of (c) iteratively tuning the parameters of the neural network based on a difference between the processed perceptual domain audio training signal and an original perceptual domain audio signal.

In some embodiments, the neural network may be trained in the perceptual domain based on one or more loss functions.

In some embodiments, the neural network may be trained in the perceptual domain based on a negative log likelihood condition.

In accordance with a fifth aspect of the present disclosure there is provided a method of obtaining and transmitting a latent feature space representation of a perceptual domain audio signal using a neural network. The method may include the step of (a) obtaining a perceptual domain audio signal by applying a mask indicative of masking thresholds derived from a psychoacoustic model to an audio signal in an original signal domain. The method may further include the step of (b) inputting the perceptual domain audio signal into a neural network for mapping the perceptual domain audio signal to a latent feature space representation. The method may further include the step of (c) obtaining, as an output from the neural network, the latent feature space representation of the perceptual domain audio signal. And the method may include the step of (d) outputting the latent feature space representation of the perceptual domain audio signal as a bitstream.

In some embodiments, further information indicative of the mask may be output as the bitstream in step (d).

In some embodiments, the latent feature space representation of the perceptual domain audio signal and/or the information indicative of the mask may be quantized prior to the outputting as the bitstream.

In some embodiments, mapping the perceptual domain audio signal to the latent feature space representation by the neural network may be performed in a time domain.

In some embodiments, obtaining the perceptual domain audio signal may be performed in a frequency domain.

In accordance with a sixth aspect of the present disclosure there is provided a method of obtaining an audio signal from a latent feature space representation of a perceptual domain audio signal using a neural network. The method may include the step of (a) receiving a latent feature space representation of a perceptual domain audio signal as a bitstream. The method may further include the step of (b) inputting the latent feature space representation into a neural network for generating the perceptual domain audio signal. The method may further include the step of (c) obtaining, as an output from the neural network, the perceptual domain audio signal. And the method may include the step of (d) converting the perceptual domain audio signal to an original signal domain based on a mask indicative of masking thresholds derived from a psychoacoustic model.

In some embodiments, the neural network may be conditioned on the latent feature space representation of the perceptual domain audio signal.

In some embodiments, in step (a) further information indicative of the mask may be received as the bitstream and the neural network may be conditioned on said information.

In some embodiments, the latent feature space representation of the perceptual domain audio signal and/or the information indicative of the mask may be received quantized and inverse quantization may be performed prior to step (b).

In some embodiments, generating the perceptual domain audio signal by the neural network may be performed in a time domain.

In some embodiments, converting the perceptual domain audio signal to the original signal domain may be performed in a frequency domain.

In accordance with a seventh aspect of the present disclosure there is provided an apparatus for processing an audio signal using a neural network. The apparatus may include a neural network and one or more processors configured to perform a method including the steps of (a) obtaining a perceptual domain audio signal; (b) inputting the perceptual domain audio signal into the neural network for processing the perceptual domain audio signal; (c) obtaining, as an output from the neural network, a processed perceptual domain audio signal; and (d) converting the processed perceptual domain audio signal to an original signal domain based on a mask indicating masking thresholds derived from a psychoacoustic model.

In accordance with an eight aspect of the present disclosure there is provided an apparatus for obtaining and transmitting a latent feature space representation of a perceptual domain audio signal using a neural network. The apparatus may include a neural network and one or more processors configured to perform a method including the steps of: (a) obtaining a perceptual domain audio signal by applying a mask indicative of masking thresholds derived from a psychoacoustic model to an audio signal in an original signal domain; (b) inputting the perceptual domain audio signal into a neural network for mapping the perceptual domain audio signal to a latent feature space representation; (c) obtaining, as an output from the neural network, the latent feature space representation of the perceptual domain audio signal; and (d) outputting the latent feature space representation of the perceptual domain audio signal as a bitstream.

In accordance with a ninth aspect of the present disclosure there is provided an apparatus for obtaining an audio signal from a latent feature space representation of a perceptual domain audio signal using a neural network. The apparatus may include a neural network and one or more processors configured to perform a method including the steps of: (a) receiving a latent feature space representation of a perceptual domain audio signal as a bitstream; (b) inputting the latent feature space representation into a neural network for generating the perceptual domain audio signal; (c) obtaining, as an output from the second neural network, the perceptual domain audio signal; and (d) converting the perceptual domain audio signal to an original signal domain based on a mask indicative of masking thresholds derived from a psychoacoustic model.

In accordance with a tenth to fifteenth aspect of the present disclosure there are provided computer program products comprising computer-readable storage media with instructions adapted to cause the devices to carry out the methods described herein when executed by a device having processing capability.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Overview

While neural networks have shown promise for encoding and/or decoding images, videos, and even speech, encoding and/or decoding general audio is challenging using neural networks. There are two factors that make the compression of general audio complicated with neural networks, firstly, audio encoders and decoders need to take advantage of the limitations of the human auditory system to achieve high performance. To take advantage perceptual limitation of the human auditory system, neural networks cannot be trained with non-perceptual loss functions directly such as L1 or L2:

$$L1 = \frac{1}{N}\sum_{n=1}^{N}|x_n - \bar{x}_n|$$

$$L2 = \frac{1}{N}\sum_{n=1}^{N}|x_n - \bar{x}_n|^2$$

where, $x_n$ is the target (ground truth) and $\bar{x}_n$ is the prediction (output of the network).

Secondly, general audio signals have very high dynamic range and are very diverse in nature, which complicates neural network training.

The present disclosure describes methods and apparatuses for transforming the audio signal into a perceptual domain prior to the application of a neural network in respective audio encoders and/or decoders. The perceptual domain conversion of the audio signal not only significantly reduces the dynamic range, but it also allows non-perceptual loss functions such as L1 and L2 to be used to train the network.

A Method of Processing an Audio Signal using a Neural Network

Figure 1:
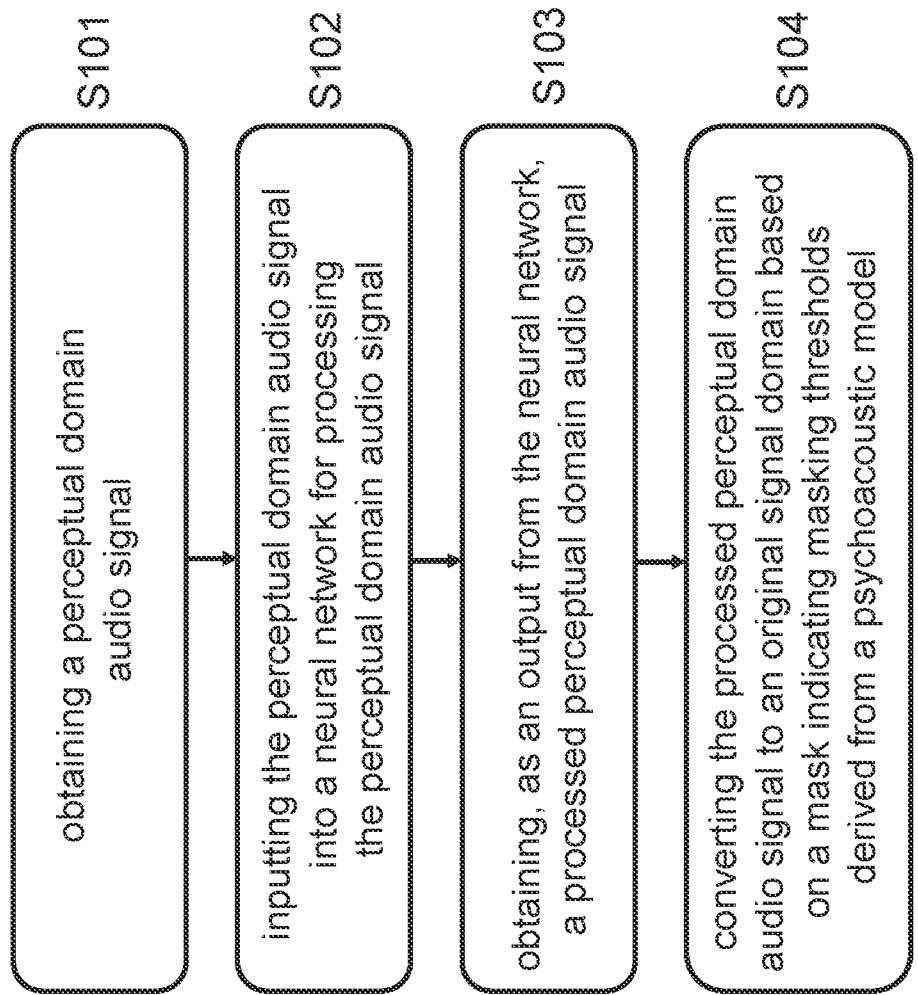
FIG. 1 illustrates an example of a method of processing an audio signal using a neural network.

Referring to the example of FIG. 1, a method of processing an audio signal using a neural network is illustrated. In step S101, a perceptual domain audio signal is obtained. The term perceptual domain as used herein refers to a signal in which the relative difference in level between frequency components is (approximately) proportional to their relative subjective importance. In general, an audio signal converted to a perceptual domain minimizes the audible impact of adding white noise (spectrally flat noise) to the perceptual domain signal, since the noise will be shaped to minimize audibility when the signal is converted back to the original signal domain.

Figure 2:
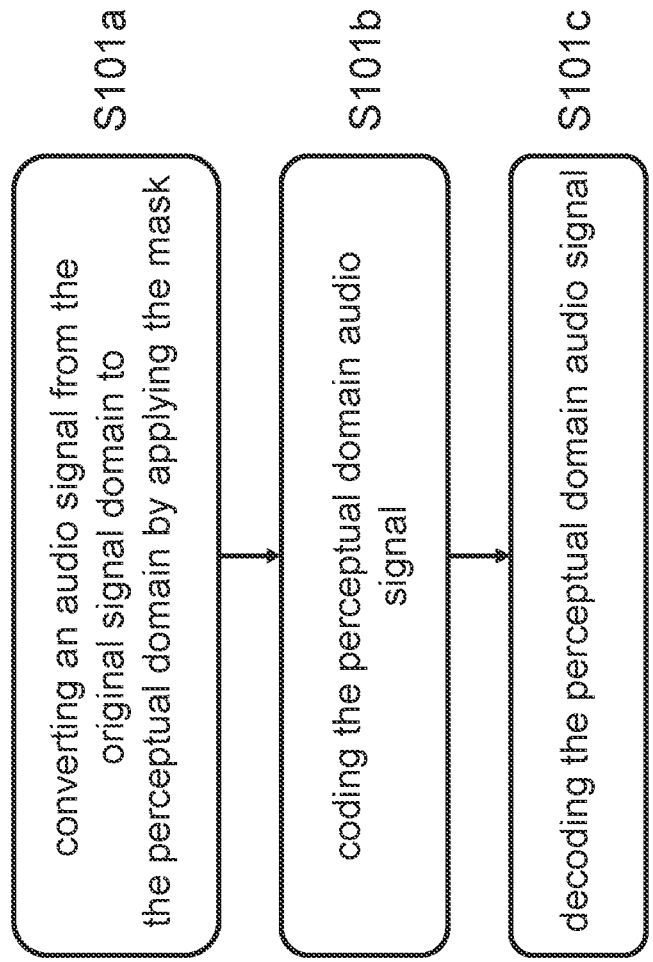
FIG. 2 illustrates a further example of a method of processing an audio signal using a neural network.

Referring to the example of FIG. 2, the perceptual domain audio signal may be obtained from steps S101a, S101b and S101c, wherein in step S101a an audio signal may be converted from the original signal domain to the perceptual domain by applying a mask.

Figure 8:
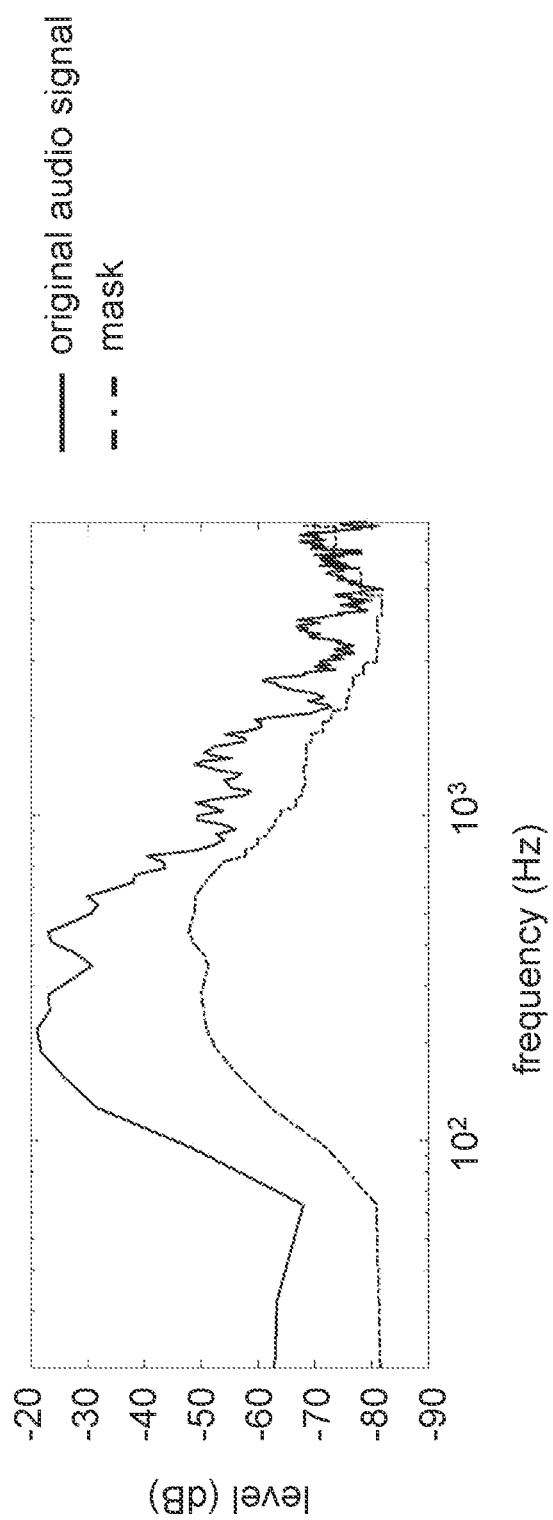
FIG. 8 illustrates an example of an original audio signal and a mask as a function of level and frequency.
Figure 9:
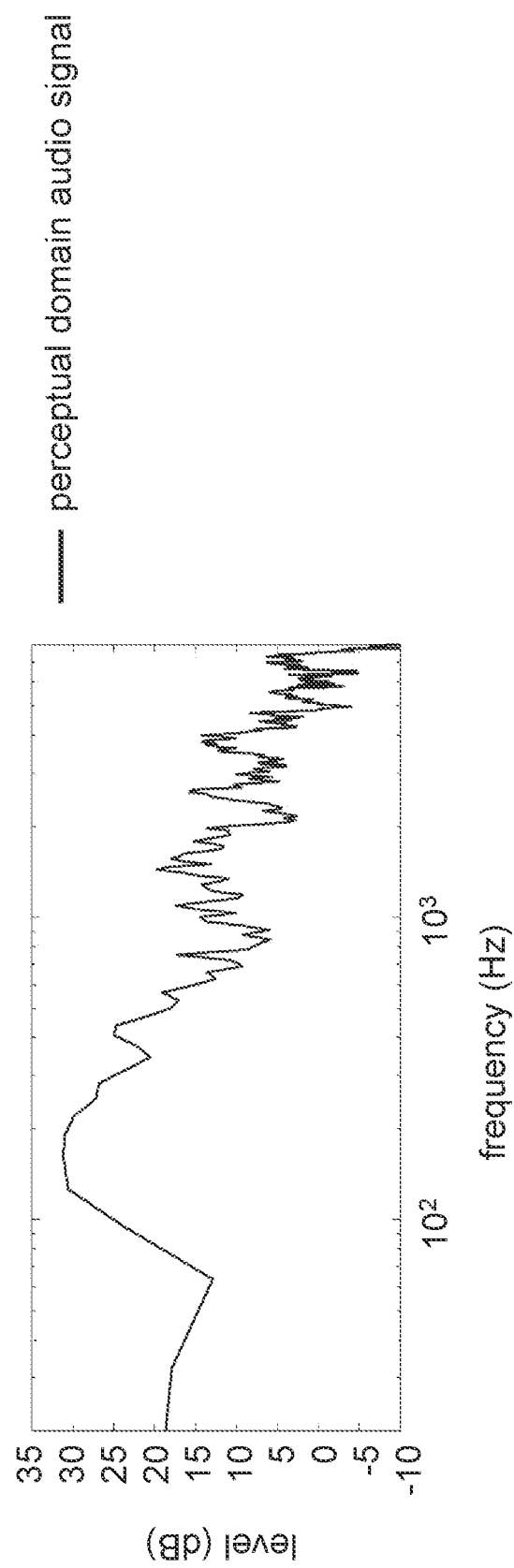
FIG. 9 illustrates an example of a perceptual domain audio signal as a function of level and frequency obtained from applying the mask to the original audio signal.

One way to convert an audio signal to the perceptual domain may be, for example, to use a psychoacoustic model to estimate a mask or masking curve. A masking curve generally defines the level of just noticeable distortion (JND) that the human auditory system can detect for a given stimulus signal. Once the masking curve has been derived from the psychoacoustic model, the spectrum of the audio signal may be divided by the masking curve to produce a perceptual domain audio signal. The perceptual domain audio signal derived from the multiplication by the inverse mask estimate may be converted back to the original signal by multiplying by the mask after neural network encoding and/or decoding. The multiplication by the mask after decoding will ensure error introduced by the encoding and decoding process follows the masking curve. While this is one way of converting an original audio signal into the perceptual domain, it is noted that also a number of other ways is conceivable, for example, filtering in the time domain by an appropriately designed time varying filter. Referring to the example of FIGS. 8 and 9, a conversion of a spectrum of an original audio signal to the perceptual domain is illustrated. The plot of FIG. 8 illustrates a spectrum of an original audio signal (solid line) and the estimated mask or masking curve (dash-dot line) calculated with a psychoacoustic model. The perceptual domain signal resulting from multiplication by the inverse mask estimate is illustrated in the plot of FIG. 9. The perceptual domain signal not only allows simple loss terms to be used during training of a neural network, but as illustrated in FIG. 8, it exhibits much less dynamic range than the original audio signal spectrum.

Referring again to the example of FIG. 2, in step S101b, the perceptual domain audio signal may then be encoded and subsequently decoded in step S101c to obtain the perceptual domain audio signal. In some embodiments, quantization may be applied to the perceptual domain audio signal prior to encoding and inverse quantization may be applied to the perceptual domain audio signal after decoding.

Referring again the example of FIG. 1, in step S102, the perceptual domain audio signal is input into the neural network for processing the perceptual domain audio signal. The neural network used is not limited and may be chosen according to the processing requirements. While the neural network may operate in a frequency domain as well as in a time domain, in some embodiments, processing the perceptual domain audio signal by the neural network may be performed in the time domain. Further, in some embodiments, the neural network may be conditioned on information indicative of the mask. Alternatively, or additionally, in some embodiments, the neural network may be conditioned on the perceptual domain audio signal.

Processing the perceptual domain audio signal by the neural network, in some embodiments, may include predicting the processed perceptual domain audio signal across time. Alternatively, in some embodiments, processing the perceptual domain audio signal by the neural network may include predicting the processed perceptual domain audio signal across frequency. Further, alternatively, in some embodiments, processing the perceptual domain audio signal by the neural network may include predicting the processed perceptual domain audio signal across time and frequency.

In step S103, a processed perceptual domain audio signal is then obtained as an output from the neural network. In some embodiments, the processed perceptual domain audio signal may be converted to the frequency domain prior to the following step S104.

In step S104, the processed perceptual domain audio signal is converted to an original signal domain based on a mask indicating masking thresholds derived from a psychoacoustic model. For example, to calculate the mask, the psychoacoustic model may utilize frequency coefficients from the Time to Frequency Transform applied to convert the processed perceptual domain audio signal to the frequency domain. Alternatively, or additionally, the mask used in step S104 may be based on the mask that had been used to convert the original audio signal into the perceptual domain. In this case, the mask may be obtained as side information; the mask may optionally be quantized.

The term "original audio signal" as used herein thus refers to the respective signal domain of the audio signal prior to conversion of the audio signal into the perceptual domain.

The method as described above may be implemented in various ways. For example, said method may be implemented by an apparatus for processing an audio signal using a neural network, wherein the apparatus includes a neural network and one or more processors configured to perform said method.

Figure 3:
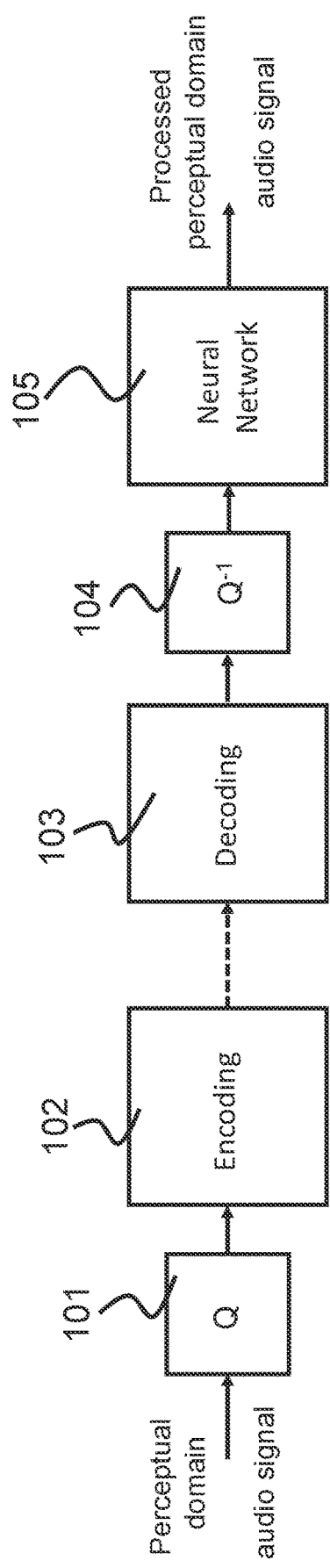
FIG. 3 illustrates an example of a system including an apparatus for processing an audio signal using a neural network.

Referring to the example of FIG. 3, a system including an apparatus for processing an audio signal using a neural network is illustrated. The apparatus may be a decoder. In this case, the neural network is only used in the decoder.

As illustrated in the example of FIG. 3, a perceptual domain audio signal may be subjected to quantization in a quantizer, 101, and may be (entropy) encoded by a respective legacy encoder, 102, for example. The quantized encoded perceptual audio signal may then be transmitted, for example as a bitstream, to the decoder, 103, to obtain the quantized perceptual domain audio signal, for example, by (entropy) decoding the received bitstream. The quantized perceptual domain audio signal may then be subjected to inverse quantization in a respective inverse quantizer, 104. The obtained perceptual domain audio signal may then be input into a neural network (decoder neural network), 105, to obtain a processed perceptual domain audio signal as output from the neural network, 105.

Alternatively, or additionally, the above described method may be implemented by a computer program product comprising a computer-readable storage medium with instructions adapted to cause a device to carry out said method when executed by a device having processing capability.

Figure 4A:
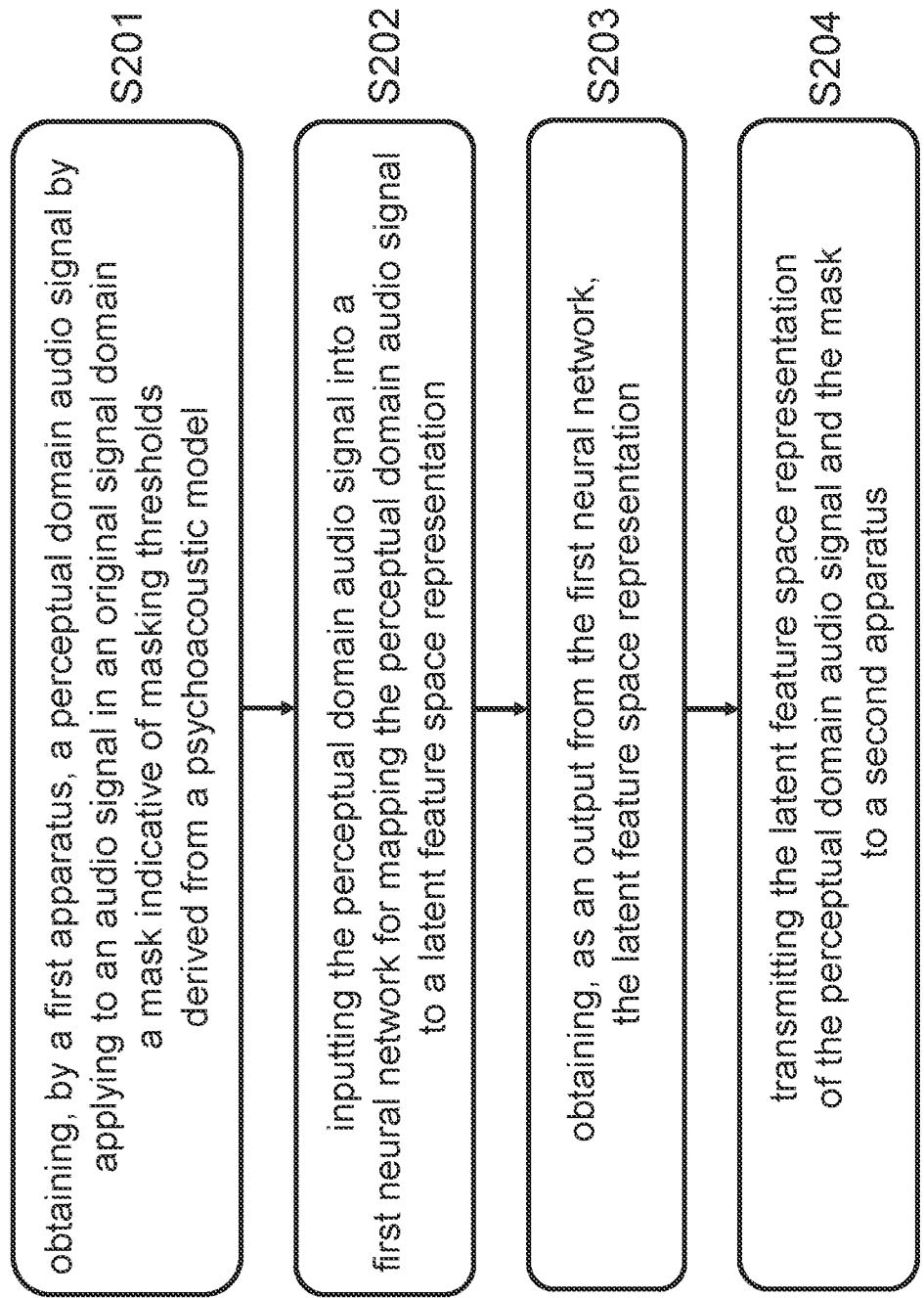
FIGS. 4a and 4b illustrate an example of a method of processing an audio signal using a first and a second neural network.
Figure 4B:
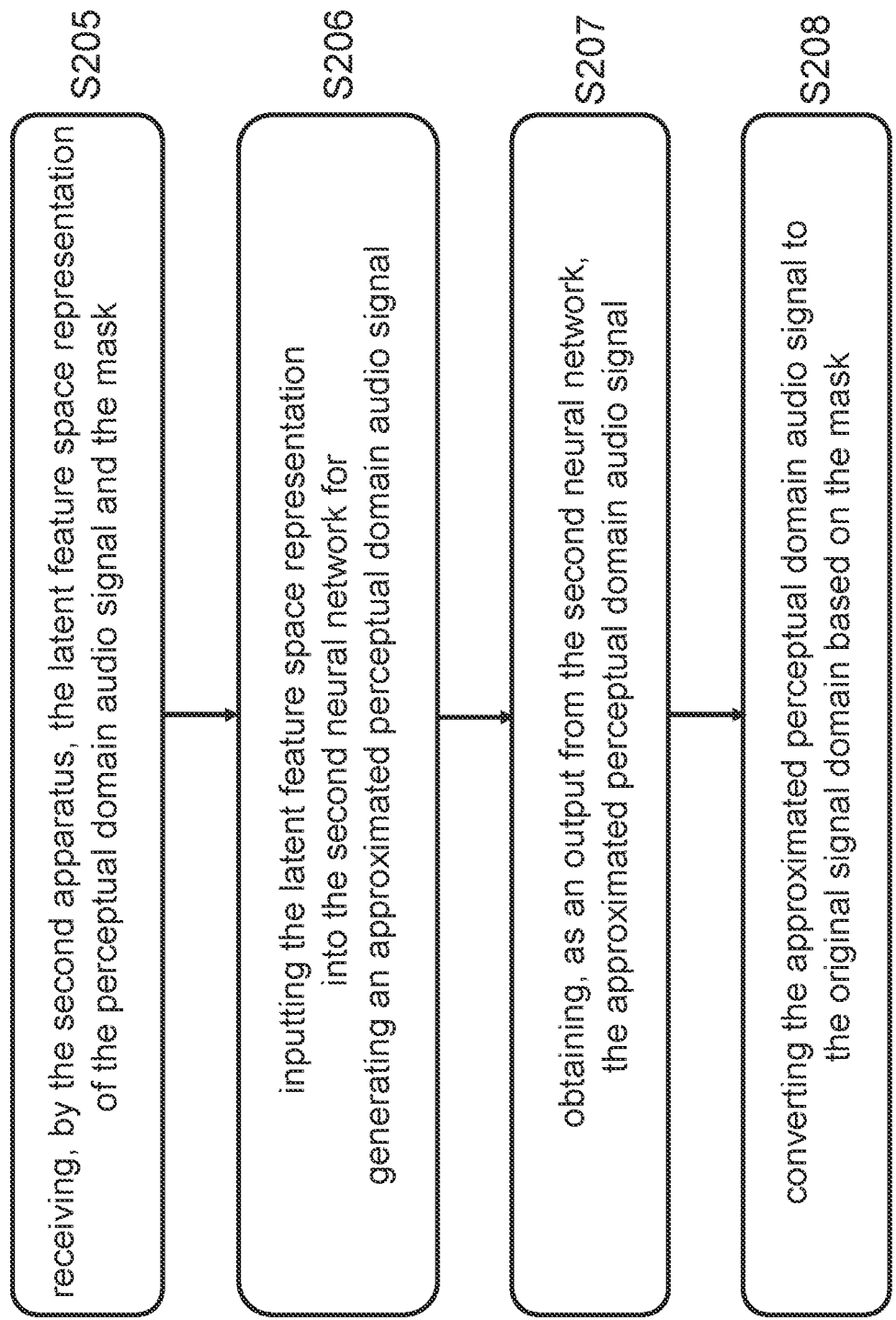

A Method of Processing an Audio Signal using a First and a Second Neural Network Referring to the example of FIGS. 4a and 4b, a method of processing an audio signal using a first and a second neural network is illustrated. The first neural network may, for example, be implemented at an encoder site, while the second neural network may be implemented at a decoder site.

As illustrated in the example of FIG. 4a, in step S201, a perceptual domain audio signal is obtained by a first apparatus by applying to an audio signal in an original signal domain a mask indicative of masking thresholds derived from a psychoacoustic model. The first apparatus may be an encoder, for example. In some embodiments, obtaining the perceptual domain audio signal may be performed in a frequency domain.

In step S202, the obtained perceptual domain audio signal is then input into the first neural network for mapping the perceptual domain audio signal to a latent feature space representation.

In some embodiments, mapping the perceptual domain audio signal to the latent feature space representation by the first neural network may be performed in a time domain.

As an output from the first neural network, in step S203, the latent feature space representation is obtained.

In step S204, the latent feature space representation of the perceptual domain audio signal and the mask are then transmitted to a second apparatus. In some embodiments, the above described method may further include encoding the latent feature space representation of the perceptual domain audio signal and the mask into a bitstream and transmitting the bitstream to the second apparatus. In some embodiments, the latent feature space representation of the perceptual domain audio signal and the mask may additionally be quantized before encoding into the bitstream.

Referring now to the example of FIG. 4b, in step S205, the latent feature space representation of the perceptual domain audio signal and the mask are received by the second apparatus. The second apparatus may be a decoder, for example. In some embodiments, the method may further include receiving the latent feature space representation of the perceptual domain audio signal and the mask as a bitstream by the second apparatus and decoding the bitstream to obtain the latent feature space representation of the perceptual domain audio signal and the mask. In some embodiments, in the case where the latent feature space representation of the perceptual domain audio signal and the mask are quantized, the latent feature space representation of the perceptual domain audio signal and the mask may be dequantized before processing by the second neural network.

In step S206, the latent feature space representation is input into the second neural network for generating an approximated perceptual domain audio signal. In some embodiments, the second neural network may be conditioned on the latent feature space representation of the perceptual domain audio signal and/or the mask. In some embodiments, generating the approximated perceptual domain audio signal by the second neural network may be performed in the time domain.

In step S207, as an output from the second neural network, the approximated perceptual domain audio signal is obtained.

The approximated perceptual domain audio signal is converted in step S208 to the original signal domain based on the mask. In some embodiments, converting the approximated perceptual domain signal may be performed in the frequency domain.

The above described method may be implemented by a system of a respective first and a second apparatus. Alternatively, or additionally, the above described method below may also be implemented by a respective computer program product comprising a computer-readable storage medium with instructions adapted to cause a device to carry out said methods when executed by a device having processing capability.

Alternatively, the above described method may be implemented in part by an apparatus for obtaining and transmitting a latent feature space representation of a perceptual domain audio signal using a neural network and in part by an apparatus for obtaining an audio signal from a latent feature space representation of a perceptual domain audio signal using a neural network. The apparatuses may then be implemented as stand-alone apparatuses or as a system.

The method of obtaining and transmitting a latent feature space representation of a perceptual domain audio signal using a neural network then includes the following steps. In step (a), a perceptual domain audio signal is obtained by applying a mask indicative of masking thresholds derived from a psychoacoustic model to an audio signal in an original signal domain. In some embodiments, obtaining the perceptual domain audio signal may be performed in a frequency domain.

In step (b), the perceptual domain audio signal is input into a neural network for mapping the perceptual domain audio signal to a latent feature space representation. In some embodiments, mapping the perceptual domain audio signal to the latent feature space representation by the neural network may be performed in a time domain.

As an output from the neural network, in step (c), the latent feature space representation of the perceptual domain audio signal is obtained. And in step (d), the latent feature space representation of the perceptual domain audio signal is then output as a bitstream.

In some embodiments, further information indicative of the mask may be output as the bitstream in step (d). In some embodiments, the latent feature space representation of the perceptual domain audio signal and/or the information indicative of the mask may be quantized prior to the outputting as the bitstream.

A method of obtaining an audio signal from a latent feature space representation of a perceptual domain audio signal using a neural network then includes the following steps. In step (a), a latent feature space representation of a perceptual domain audio signal is received as a bitstream. In step (b), the latent feature space representation is input into a neural network for generating the perceptual domain audio signal. In step (c), as an output from the neural network, the perceptual domain audio signal is obtained. And in step (d), the perceptual domain audio signal is converted to an original signal domain based on a mask indicative of masking thresholds derived from a psychoacoustic model.

In some embodiments, the neural network may be conditioned on the latent feature space representation of the perceptual domain audio signal. In some embodiments, further, in step (a), information indicative of the mask may be received as the bitstream and the neural network may be conditioned on said information. In some embodiments, the latent feature space representation of the perceptual domain audio signal and/or the information indicative of the mask may be received quantized and inverse quantization may be performed prior to step (b). In some embodiments, generating the perceptual domain audio signal by the neural network may be performed in a time domain. In some embodiments, converting the perceptual domain audio signal to the original signal domain may be performed in a frequency domain.

Figure 5:
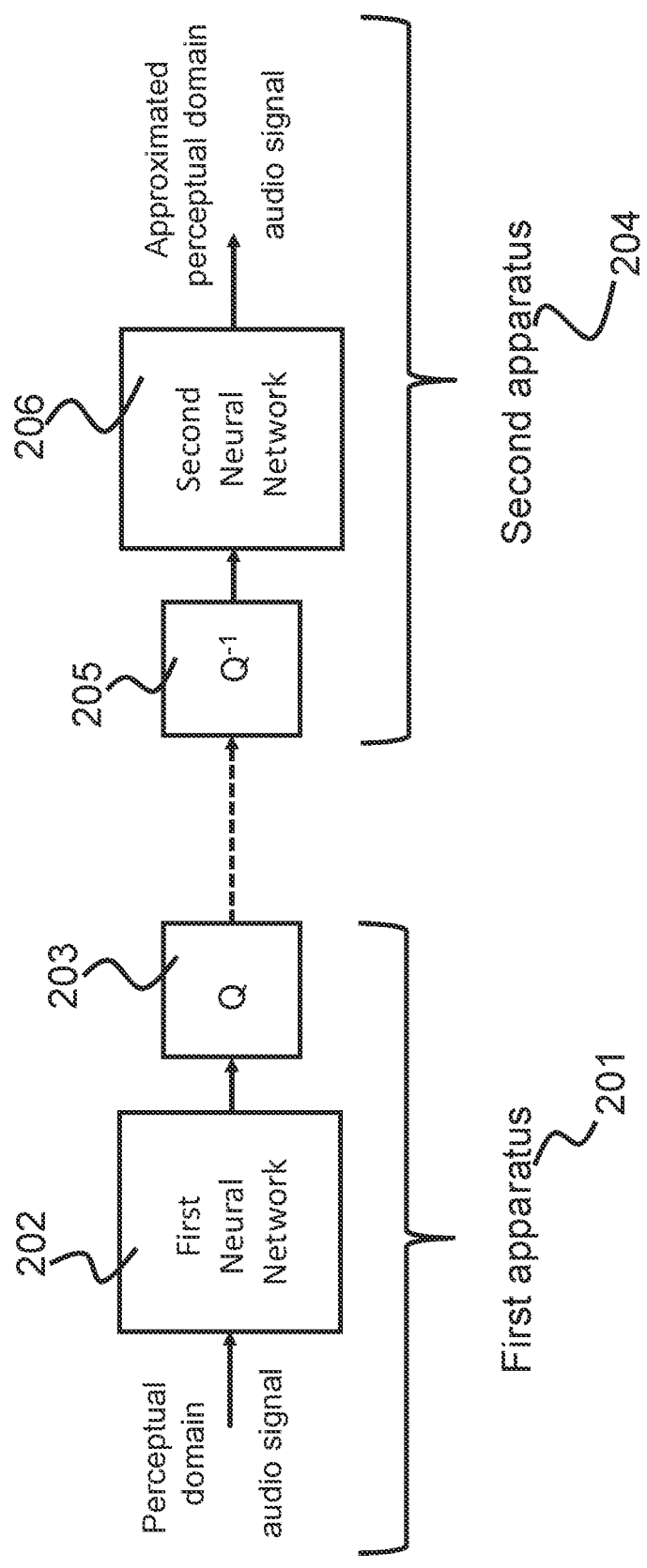
FIG. 5 illustrates an example of a system of an apparatus for obtaining and transmitting a latent feature space representation of a perceptual domain audio signal using a neural network and an apparatus for obtaining an audio signal from a latent feature space representation of a perceptual domain audio signal using a neural network.

Referring to the example of FIG. 5, a system of an apparatus for obtaining and transmitting a latent feature space representation of a perceptual domain audio signal using a neural network (also first apparatus) and an apparatus for obtaining an audio signal from a latent feature space representation of a perceptual domain audio signal using a neural network (also second apparatus) is illustrated.

In the example of FIG. 5, in the (first) apparatus, 201, a perceptual domain audio signal may be input into a (first) neural network, 202, for processing as described above. The first neural network, 202, may be an encoder neural network. The latent feature space representation output from the (first) neural network may be quantized in a quantizer, 203, and transmitted to the (second) apparatus, 204. The quantized latent feature space representation may be encoded and transmitted to the (second) apparatus, 204, as a bitstream. In the (second) apparatus, 204, the received latent feature space representation may be inversely quantized first in an inverse quantizer, 205, and optionally decoded before inputting into the (second) neural network, 206, for generating an approximated perceptual domain audio signal based on the latent feature space representation. As an output from the (second) neural network, 206, the approximated perceptual domain audio signal may then be obtained.

A Method of Training a Neural Network

Figure 6:
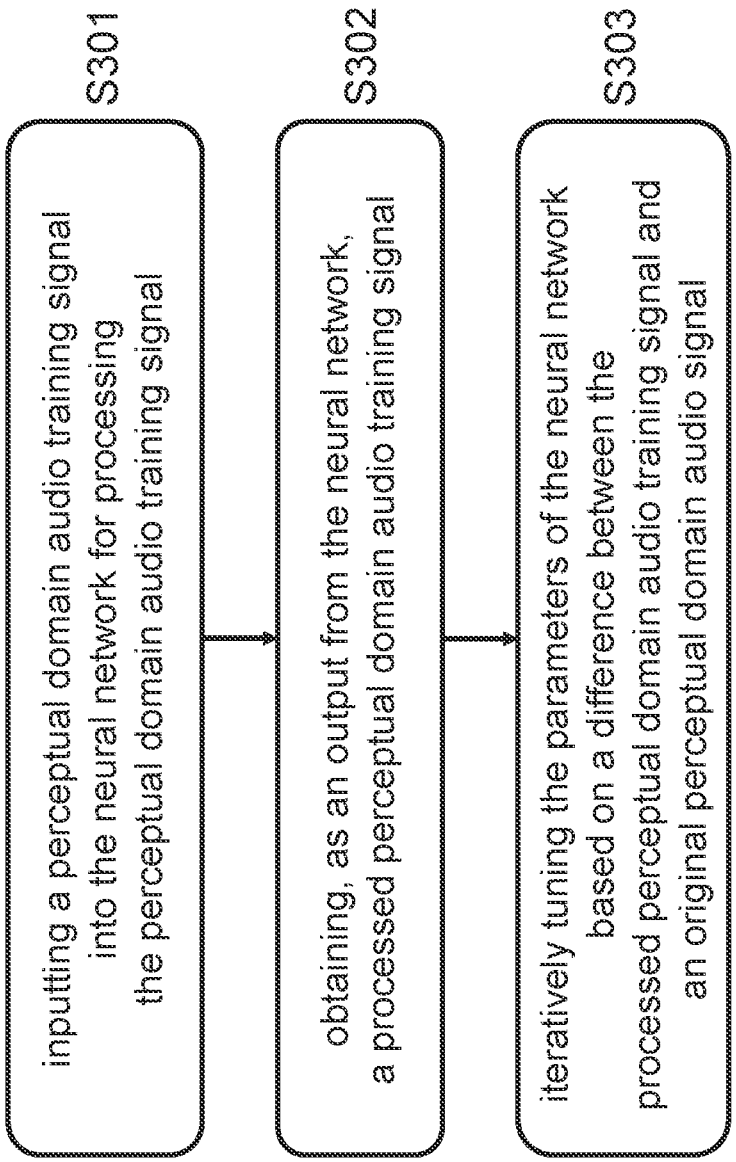
FIG. 6 illustrates an example of a method of training a neural network.

Referring to the example of FIG. 6, a method of training a neural network is illustrated. In step S301, a perceptual domain audio training signal is input into the neural network for processing the perceptual domain audio training signal. The perceptual domain audio training signal is processed by the neural network and in step S302, a processed perceptual domain audio training signal is then obtained as an output from said neural network. Based on a difference between the processed perceptual domain audio training signal and an original perceptual domain audio signal from which the perceptual domain audio training signal may have been obtained, the parameters of the neural network are then iteratively tuned in step S303. Based on this iterative tuning, the neural network is trained to generate better and better processed perceptual domain audio training signals. The goal of this iterative tuning is to make the neural network generate a processed perceptual domain audio training signal that is indistinguishable from the respective original perceptual domain audio signal.

In some embodiments, the neural network may be trained in the perceptual domain based on one or more loss functions. A neural network designed to code audio signals in the perceptual domain may be trained with simple loss functions such as L1 and L2 as these may introduce spectrally white error. In case of L1 and L2, the neural network may predict the mean of the processed perceptual domain audio training signal.

Alternatively, in some embodiments, the neural network may be trained in the perceptual domain based on a negative log likelihood (NLL) condition. In case of NLL, the neural network may predict the mean and scale as parameterization from a pre-chosen distribution. A log operation of scale parameter may typically be used to avoid numeric instability. The pre-chosen distribution may be Laplacian. Alternatively, the pre-chosen distribution may be a Logistic or Gaussian distribution. In case of a Gaussian distribution, the scale parameter may be replaced with a variance parameter. For the NLL case, a sampling operation may be used to convert from distribution parameters to the processed perceptual domain audio training signal. The sampling operation can be written as:

$$\tilde{x} = \text{mean} + F(u, \text{scale})$$

where x̃ is the predicted processed perceptual domain audio training signal, mean and scale are the predicted parameters from the neural network, F( ) is the sampling function determined by the pre-chosen distribution and u is sampled from a uniform distribution.

For example, in a Laplacian case, $$F = -\text{scale} * \text{sign}(u) * \log(1 - 2*|u|), u \sim (-0.5, 0.5)$$

a weighting function derived from a quantized mask may be applied to the scale parameter in sampling function F( ). Further, in case of sampling from a mixture for each output coefficient (e.g. Gaussian mixture), there may be a vector of parameters.

A Method of Jointly Training a Set of a First and a Second Neural Network

Figure 7:
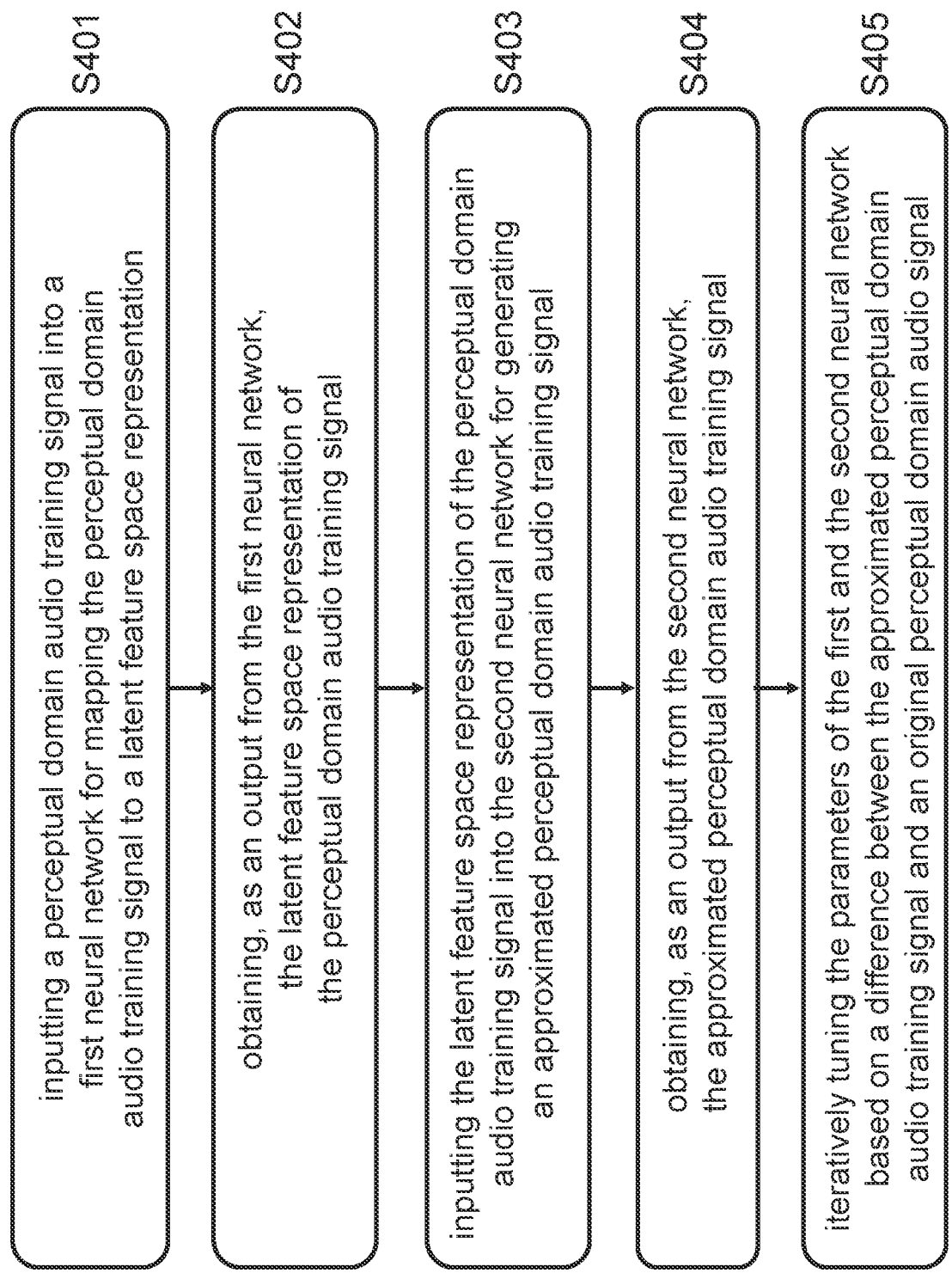
FIG. 7 illustrates an example of a method of jointly training a set of a first and a second neural network.

Referring to the example of FIG. 7, a method of jointly training a set of a first and a second neural network is illustrated.

In step S401, a perceptual domain audio training signal is input into the first neural network for mapping the perceptual domain audio training signal to a latent feature space representation. In step S402, as an output from the first neural network, the latent feature space representation of the perceptual domain audio training signal is obtained. In step S403, the latent feature space representation of the perceptual domain audio training signal is then input into the second neural network for generating an approximated perceptual domain audio training signal. As an output from the second neural network, in step S404, the approximated perceptual domain audio training signal is then obtained. And in step S405, the parameters of the first and the second neural network are iteratively tuned based on a difference between the approximated perceptual domain audio training signal and an original perceptual domain audio signal based on which the perceptual domain audio training signal has been derived.

In some embodiments, the first and the second neural network may be trained in the perceptual domain based on one or more loss functions. In some embodiments, the first and the second neural network may be trained in the perceptual domain based on a negative log likelihood (NLL) condition. The goal of the iterative tuning is to make the first and the second neural network generate an approximated perceptual domain audio training signal that is indistinguishable from the respective original perceptual domain audio signal.

Further Exemplary Embodiments

Figure 10:
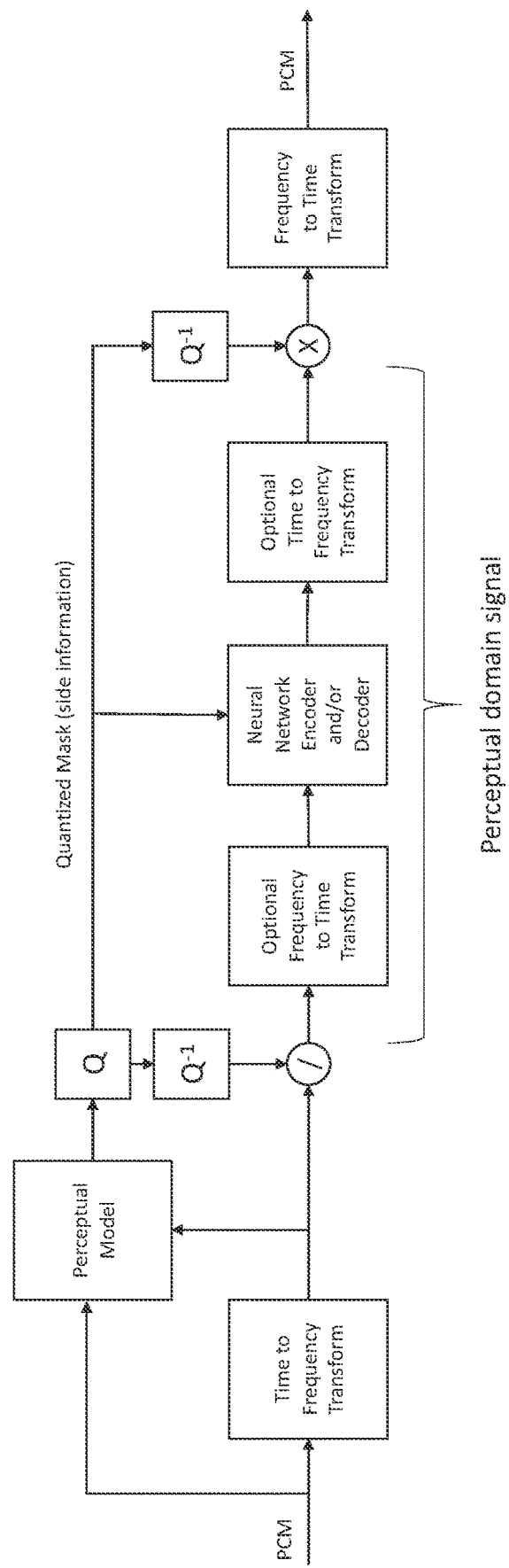
FIG. 10 illustrates an example of converting an audio signal to a perceptual domain and processing said audio signal using a neural network.
Figure 11:
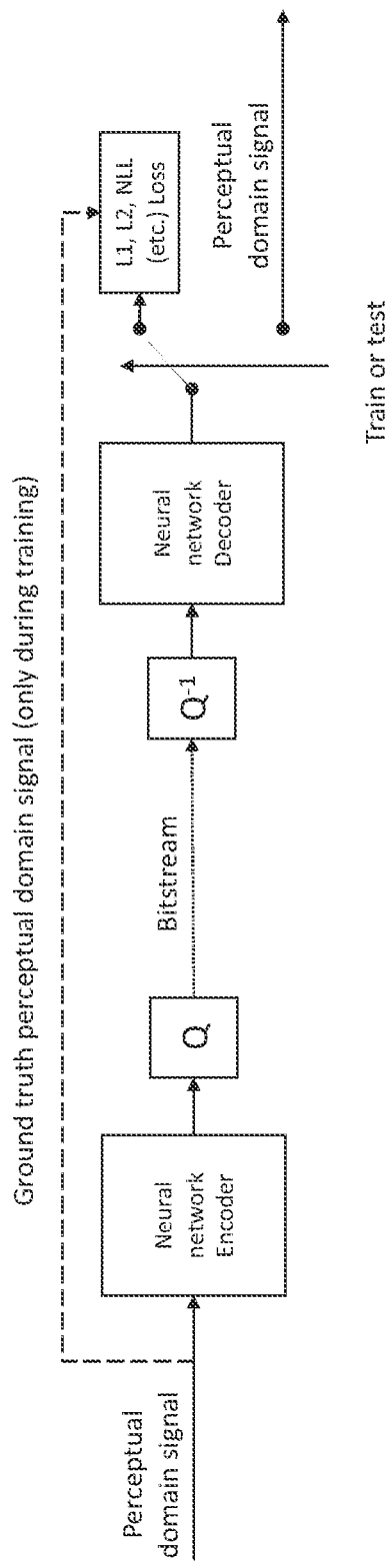
FIG. 11 illustrates an example of an audio encoder and decoder operating in the perceptual domain with a neural network in both the encoder and decoder. The figure also illustrates an example of a use of simple loss functions for the training of the neural networks as the networks are operating in the perceptual domain.
Figure 12:
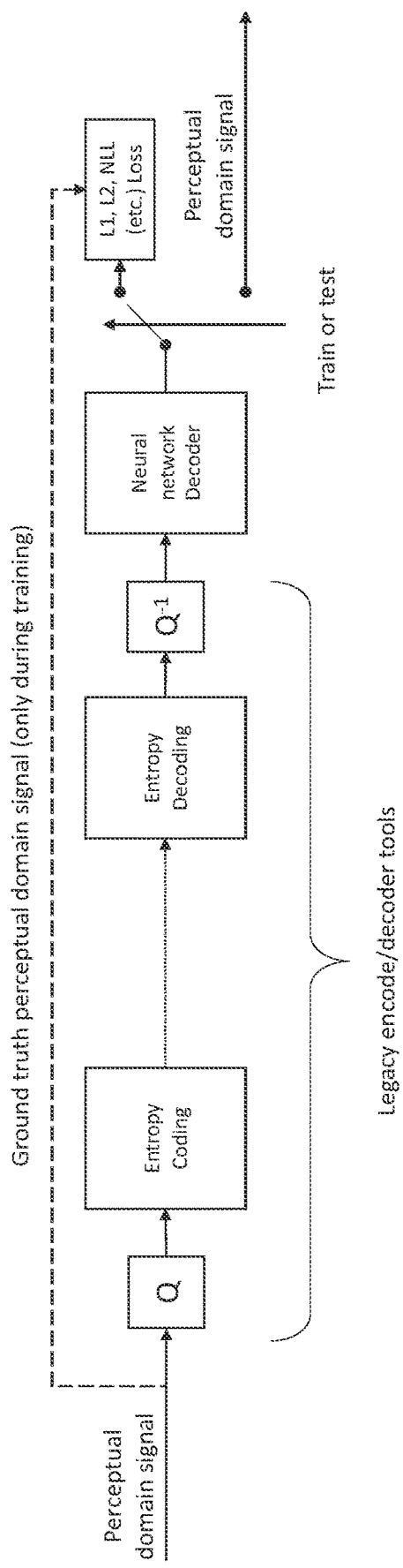
FIG. 12 illustrates an example of an audio encoder and decoder operating in the perceptual domain with a neural network in the decoder. The figure also illustrates an example of a use of simple loss functions for the training of the neural network as the network is operating in the perceptual domain.

Referring to the examples of FIGS. 10 to 12, further exemplary embodiments of the methods and apparatuses described herein are illustrated. In the example of FIG. 10, a schematic showing the conversion of an audio signal to a perceptual domain for data reduction using a neural network is illustrated. In the example of FIG. 10, PCM audio data are used as the input.

In the example of FIG. 11, a schematic of an audio encoder and decoder operating in the perceptual domain with a neural network in both the encoder and decoder is illustrated. FIG. 11 also shows the use of simple loss functions for the training of the neural networks as the networks are operating in the perceptual domain. In the example of FIG. 11, ground truth signal refers to an original perceptual domain audio signal based on which the respective perceptual domain audio training signal may be derived and which may be compared to the approximated perceptual domain audio signal for iteratively tuning the neural networks.

In the example of FIG. 12, a schematic of an audio encoder and decoder operating in the perceptual domain with a neural network in the decoder is illustrated. FIG. 12 also shows the use of simple loss functions for the training of the neural network as the network is operating in the perceptual domain. Also, in this case ground truth signal refers to an original perceptual domain audio signal based on which the respective perceptual domain audio training signal may be derived and which may be compared to the processed perceptual domain audio signal for iteratively tuning the neural network.

Interpretation

Unless specifically stated otherwise, as apparent from the following discussions, it is appreciated that throughout the disclosure discussions utilizing terms such as "processing", "computing", "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one embodiment", "some embodiments" or "an example embodiment" means that a particular feature, structure or characteristic described in connection with the embodiment is included in at least one embodiment of the present disclosure. Thus, appearances of the phrases "in one embodiment", "in some embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE 1. A computer-implemented method of encoding an audio signal using a neural network, the method including the steps of:
(a) obtaining a perceptual domain audio signal by applying a mask indicative of masking thresholds derived from a psychoacoustic model to the audio signal in an original signal domain;
(b) inputting the perceptual domain audio signal into a neural network for mapping the perceptual domain audio signal to a latent feature space representation;
(c) obtaining, as an output from the neural network, the latent feature space representation of the perceptual domain audio signal; and
(d) outputting the latent feature space representation of the perceptual domain audio signal in a bitstream.

EEE 2. The method according to EEE 1, wherein further information indicative of the mask is output in the bitstream in step (d).

EEE 3. The method according to EEE 1 or 2, wherein the latent feature space representation of the perceptual domain audio signal and/or the information indicative of the mask are quantized prior to the outputting in the bitstream.

EEE 4. The method according to any one of EEEs 1 to 3, wherein mapping the perceptual domain audio signal to the latent feature space representation by the neural network is performed in a time domain; and/or
wherein obtaining the perceptual domain audio signal is performed in a frequency domain.

EEE 5. A computer-implemented method of decoding an audio signal using a neural network, wherein the method includes the steps of:

(a) obtaining a representation of a perceptual domain audio signal;
(b) inputting the representation of the perceptual domain audio signal into the neural network for processing the representation of the perceptual domain audio signal;
(c) obtaining, as an output from the neural network, a processed perceptual domain audio signal; and
(d) converting the processed perceptual domain audio signal to an original signal domain based on a mask indicating masking thresholds derived from a psychoacoustic model.

EEE 6. The method according to EEE 5, wherein processing the perceptual domain audio signal by the neural network is performed in a time domain; and/or wherein the method further includes, before step (d), converting the audio signal to a frequency domain.

EEE 7. The method according to EEE 5 or 6, wherein the neural network is conditioned on information indicative of the mask; and/or
wherein the neural network is conditioned on the perceptual domain audio signal.

EEE 8. The method according to EEE 7, wherein processing the perceptual domain audio signal by the neural network includes at least one of:
predicting the processed perceptual domain audio signal across time;
predicting the processed perceptual domain audio signal across frequency; and
predicting the processed perceptual domain audio signal across time and frequency.

EEE 9. The method according to any one of EEEs 5 to 8, wherein the representation of the perceptual domain audio signal comprises the perceptual domain audio signal.

EEE 10. The method according to any one of EEEs 5 to 9,
wherein the representation of the perceptual domain audio signal is obtained from:
converting an audio signal from the original signal domain to the perceptual domain by applying the mask;
encoding the perceptual domain audio signal; and
decoding the perceptual domain audio signal; and optionally
wherein quantization is applied to the perceptual domain audio signal prior to encoding and inverse quantization is applied to the perceptual domain audio signal after decoding.

EEE 11. The method according to EEE 5,
wherein step (a) involves receiving a latent feature space representation of the perceptual domain audio signal in a bitstream; and
wherein step (b) involves inputting the latent feature space representation into the neural network for generating the processed perceptual domain audio signal.

EEE 12. The method according to EEE 11, wherein the neural network is conditioned on the latent feature space representation of the perceptual domain audio signal.

EEE 13. The method according to EEE 11 or 12, further comprising receiving additional information indicative of the mask as the bitstream,
wherein the neural network is conditioned on said additional information.

EEE 14. The method according to any one of EEEs 11 to 13, wherein the latent feature space representation of the perceptual domain audio signal and/or the information indicative of the mask are received in quantized form; and
wherein the method further comprises inverse quantization prior to inputting the latent feature space representation into the neural network.

EEE 15. The method according to any one of EEEs 11 to 14, wherein generating the perceptual domain audio signal by the neural network is performed in a time domain; and/or wherein converting the perceptual domain audio signal to the original signal domain is performed in a frequency domain.

EEE 16. A method (e.g., computer-implemented method) of processing an audio signal using a neural network, wherein the method includes the steps of:
(a) obtaining a perceptual domain audio signal;
(b) inputting the perceptual domain audio signal into the neural network for processing the perceptual domain audio signal;
(c) obtaining, as an output from the neural network, a processed perceptual domain audio signal; and
(d) converting the processed perceptual domain audio signal to an original signal domain based on a mask indicating masking thresholds derived from a psychoacoustic model.

EEE 17. The method according to EEE 16, wherein processing the perceptual domain audio signal by the neural network is performed in a time domain.

EEE 18. The method according to EEE 16 or 17, wherein the method further includes, before step (d), converting the audio signal to a frequency domain.

EEE 19. The method according to any one of EEEs 16 to 18, wherein the neural network is conditioned on information indicative of the mask.

EEE 20. The method according to any one of EEEs 16 to 19, wherein the neural network is conditioned on the perceptual domain audio signal.

EEE 21. The method according to EEE 19 or 20, wherein processing the perceptual domain audio signal by the neural network includes predicting the processed perceptual domain audio signal across time.

EEE 22. The method according to EEE 19 or 20, wherein processing the perceptual domain audio signal by the neural network includes predicting the processed perceptual domain audio signal across frequency.

EEE 23. The method according to EEE 19 or 20, wherein processing the perceptual domain audio signal by the neural network includes predicting the processed perceptual domain audio signal across time and frequency.

EEE 24. The method according to any one of EEEs 16 to 23, wherein the perceptual domain audio signal is obtained from:
(a) converting an audio signal from the original signal domain to the perceptual domain by applying the mask;
(b) encoding the perceptual domain audio signal; and
(c) decoding the perceptual domain audio signal.

EEE 25. The method according to EEE 24, wherein quantization is applied to the perceptual domain audio signal prior to encoding and inverse quantization is applied to the perceptual domain audio signal after decoding.

EEE 26. A method (e.g., computer-implemented method) of processing an audio signal using a first and a second neural network, wherein the method includes the steps of:
 (a) obtaining, by a first apparatus, a perceptual domain audio signal by applying to an audio signal in an original signal domain a mask indicative of masking thresholds derived from a psychoacoustic model;
 (b) inputting the perceptual domain audio signal into the first neural network for mapping the perceptual domain audio signal to a latent feature space representation;
 (c) obtaining, as an output from the first neural network, the latent feature space representation;
 (d) transmitting the latent feature space representation of the perceptual domain audio signal and the mask to a second apparatus;
 (e) receiving, by the second apparatus, the latent feature space representation of the perceptual domain audio signal and the mask;
 (f) inputting the latent feature space representation into the second neural network for generating an approximated perceptual domain audio signal;
 (g) obtaining, as an output from the second neural network, the approximated perceptual domain audio signal; and
 (h) converting the approximated perceptual domain audio signal to the original signal domain based on the mask.

EEE 27. The method according to EEE 26, wherein the method further includes encoding the latent feature space representation of the perceptual domain audio signal and the mask into a bitstream and transmitting the bitstream to the second apparatus, and wherein the method further includes receiving the bitstream by the second apparatus and decoding the bitstream to obtain the latent feature space representation of the perceptual domain audio signal and the mask.

EEE 28. The method according to EEE 27, wherein the latent feature space representation of the perceptual domain audio signal and the mask are quantized before encoding into the bitstream and dequantized before processing by the second neural network.

EEE 29. The method according to any one of EEEs 26 to 28, wherein the second neural network is conditioned on the latent feature space representation of the perceptual domain audio signal and/or the mask.

EEE 30. The method according to any one of EEEs 26 to 29, wherein mapping the perceptual domain audio signal to the latent feature space representation by the first neural network and generating the approximated perceptual domain audio signal by the second neural network is performed in a time domain.

EEE 31. The method according to any one of EEEs 26 to 30, wherein obtaining the perceptual domain signal in step (a), and converting the approximated perceptual domain signal in step (h) are performed in a frequency domain.

EEE 32. A method (e.g., computer-implemented method) of jointly training a set of a first and a second neural network, wherein the method includes the steps of:
 (a) inputting a perceptual domain audio training signal into the first neural network for mapping the perceptual domain audio training signal to a latent feature space representation;
 (b) obtaining, as an output from the first neural network, the latent feature space representation of the perceptual domain audio training signal;
 (c) inputting the latent feature space representation of the perceptual domain audio training signal into the second neural network for generating an approximated perceptual domain audio training signal;
 (d) obtaining, as an output from the second neural network, the approximated perceptual domain audio training signal; and
 (e) iteratively tuning the parameters of the first and the second neural network based on a difference between the approximated perceptual domain audio training signal and an original perceptual domain audio signal.

EEE 33. The method according to EEE 32, wherein the first and the second neural network are trained in the perceptual domain based on one or more loss functions.

EEE 34. The method according to EEE 32, wherein the first and the second neural network are trained in the perceptual domain based on a negative log likelihood condition.

EEE 35. A method (e.g., computer-implemented method) of training a neural network, wherein the method includes the steps of:
 (a) inputting a perceptual domain audio training signal into the neural network for processing the perceptual domain audio training signal;
 (b) obtaining, as an output from the neural network, a processed perceptual domain audio training signal; and
 (c) iteratively tuning the parameters of the neural network based on a difference between the processed perceptual domain audio training signal and an original perceptual domain audio signal.

EEE 36. The method according to EEE 35, wherein the neural network is trained in the perceptual domain based on one or more loss functions.

EEE 37. The method according to EEE 35, wherein the neural network is trained in the perceptual domain based on a negative log likelihood condition.

EEE 38. A method (e.g., computer-implemented method) of obtaining and transmitting a latent feature space representation of a perceptual domain audio signal using a neural network, the method including the steps of:
 (a) obtaining a perceptual domain audio signal by applying a mask indicative of masking thresholds derived from a psychoacoustic model to an audio signal in an original signal domain;
 (b) inputting the perceptual domain audio signal into a neural network for mapping the perceptual domain audio signal to a latent feature space representation;
 (c) obtaining, as an output from the neural network, the latent feature space representation of the perceptual domain audio signal; and
 (d) outputting the latent feature space representation of the perceptual domain audio signal as a bitstream.

EEE 39. The method according to EEE 38, wherein further information indicative of the mask is output as the bitstream in step (d).

EEE 40. The method according to EEEs 38 or 39, wherein the latent feature space representation of the perceptual domain audio signal and/or the information indicative of the mask are quantized prior to the outputting as the bitstream.

EEE 41. The method according to any one of EEEs 38 to 40, wherein mapping the perceptual domain audio signal to the latent feature space representation by the neural network is performed in a time domain.

EEE 42. The method according to any one of EEEs 38 to 41, wherein obtaining the perceptual domain audio signal is performed in a frequency domain.

EEE 43. A method (e.g., computer-implemented method) of obtaining an audio signal from a latent feature space representation of a perceptual domain audio signal using a neural network, the method including the steps of:
(a) receiving a latent feature space representation of a perceptual domain audio signal as a bitstream;
(b) inputting the latent feature space representation into a neural network for generating the perceptual domain audio signal;
(c) obtaining, as an output from the neural network, the perceptual domain audio signal; and
(d) converting the perceptual domain audio signal to an original signal domain based on a mask indicative of masking thresholds derived from a psychoacoustic model.

EEE 44. The method according to EEE 43, wherein the neural network is conditioned on the latent feature space representation of the perceptual domain audio signal.

EEE 45. The method according to EEE 43 or 44, wherein in step (a) further information indicative of the mask is received as the bitstream and the neural network is conditioned on said information.

EEE 46. The method according to any one of EEEs 43 to 45, wherein the latent feature space representation of the perceptual domain audio signal and/or the information indicative of the mask are received quantized and inverse quantization is performed prior to step (b).

EEE 47. The method according to any one of EEEs 43 to 46, wherein generating the perceptual domain audio signal by the neural network is performed in a time domain.

EEE 48. The method according to any one of EEEs 43 to 47, wherein converting the perceptual domain audio signal to the original signal domain is performed in a frequency domain.

EEE 49. An apparatus for processing an audio signal using a neural network, wherein the apparatus includes a neural network and one or more processors configured to perform a method including the steps of:
(a) obtaining a perceptual domain audio signal;
(b) inputting the perceptual domain audio signal into the neural network for processing the perceptual domain audio signal;
(c) obtaining, as an output from the neural network, a processed perceptual domain audio signal; and
(d) converting the processed perceptual domain audio signal to an original signal domain based on a mask indicating masking thresholds derived from a psychoacoustic model.

EEE 50. An apparatus for obtaining and transmitting a latent feature space representation of a perceptual domain audio signal using a neural network, wherein the apparatus includes a neural network and one or more processors configured to perform a method including the steps of:
(a) obtaining a perceptual domain audio signal by applying a mask indicative of masking thresholds derived from a psychoacoustic model to an audio signal in an original signal domain;
(b) inputting the perceptual domain audio signal into a neural network for mapping the perceptual domain audio signal to a latent feature space representation;
(c) obtaining, as an output from the neural network, the latent feature space representation of the perceptual domain audio signal; and
(d) outputting the latent feature space representation of the perceptual domain audio signal as a bitstream.

EEE 51. An apparatus for obtaining an audio signal from a latent feature space representation of a perceptual domain audio signal using a neural network, wherein the apparatus includes a neural network and one or more processors configured to perform a method including the steps of:
(a) receiving a latent feature space representation of a perceptual domain audio signal as a bitstream;
(b) inputting the latent feature space representation into a neural network for generating the perceptual domain audio signal;
(c) obtaining, as an output from the second neural network, the perceptual domain audio signal; and
(d) converting the perceptual domain audio signal to an original signal domain based on a mask indicative of masking thresholds derived from a psychoacoustic model.

EEE 52. A computer program product comprising a computer-readable storage medium with instructions adapted to cause the device to carry out the method according to any one of EEEs 1 to 10 when executed by a device having processing capability.

EEE 53. A computer program product comprising a computer-readable storage medium with instructions adapted to cause the device to carry out the method according to any one of EEEs 11 to 16 when executed by a device having processing capability.

EEE 54. A computer program product comprising a computer-readable storage medium with instructions adapted to cause the device to carry out the method according to any one of EEEs 17 to 19 when executed by a device having processing capability.

EEE 55. A computer program product comprising a computer-readable storage medium with instructions adapted to cause the device to carry out the method according to any one of EEEs 20 to 22 when executed by a device having processing capability.

EEE 56. A computer program product comprising a computer-readable storage medium with instructions adapted to cause the device to carry out the method according to any one of EEEs 23 to 27 when executed by a device having processing capability.

EEE 57. A computer program product comprising a computer-readable storage medium with instructions adapted to cause the device to carry out the method according to any one of EEEs 28 to 33 when executed by a device having processing capability.

The invention claimed is:
1. A computer-implemented method of encoding an audio signal using a neural network, the method including the steps of:
(a) obtaining a perceptual domain audio signal by applying a mask indicative of masking thresholds derived from a psychoacoustic model to the audio signal in an original signal domain;

(b) inputting the perceptual domain audio signal into a neural network for mapping the perceptual domain audio signal to a latent feature space representation;

(c) obtaining, as an output from the neural network, the latent feature space representation of the perceptual domain audio signal; and (d) outputting the latent feature space representation of the perceptual domain audio signal in a bitstream.

2. The method according to claim 1, wherein further information indicative of the mask is output in the bitstream in step (d).

3. The method according to claim 1, wherein the latent feature space representation of the perceptual domain audio signal and/or the information indicative of the mask are quantized prior to the outputting in the bitstream.

4. The method according to claim 1, wherein mapping the perceptual domain audio signal to the latent feature space representation by the neural network is performed in a time domain; and/or wherein obtaining the perceptual domain audio signal is performed in a frequency domain.

5. A computer-implemented method of decoding an audio signal using a neural network, wherein the method includes the steps of:

(a) obtaining a representation of a perceptual domain audio signal by decoding a received bitstream;

(b) inputting the representation of the perceptual domain audio signal into the neural network for processing the representation of the perceptual domain audio signal;

(c) obtaining, as an output from the neural network, a processed perceptual domain audio signal; and (d) converting the processed perceptual domain audio signal to an original signal domain based on a mask indicating masking thresholds derived from a psychoacoustic model.

6. The method according to claim 5, wherein processing the perceptual domain audio signal by the neural network is performed in a time domain; and/or wherein the method further includes, before step (d), converting the audio signal to a frequency domain.

7. The method according to claim 5, wherein the neural network is conditioned on information indicative of the mask; and/or wherein the neural network is conditioned on the perceptual domain audio signal.

8. The method according to claim 7, wherein processing the perceptual domain audio signal by the neural network includes at least one of:

predicting the processed perceptual domain audio signal across time;

predicting the processed perceptual domain audio signal across frequency; and predicting the processed perceptual domain audio signal across time and frequency.

9. The method according to claim 5, wherein the representation of the perceptual domain audio signal comprises the perceptual domain audio signal.

10. The method according to claim 5, wherein the representation of the perceptual domain audio signal is obtained from:

converting an audio signal from the original signal domain to the perceptual domain by applying the mask;

encoding the perceptual domain audio signal; and decoding the perceptual domain audio signal; and optionally wherein quantization is applied to the perceptual domain audio signal prior to encoding and inverse quantization is applied to the perceptual domain audio signal after decoding.

11. The method according to claim 5, wherein step (a) involves receiving a latent feature space representation of the perceptual domain audio signal in a bitstream; and wherein step (b) involves inputting the latent feature space representation into the neural network for generating the processed perceptual domain audio signal.

12. The method according to claim 11, wherein the neural network is conditioned on the latent feature space representation of the perceptual domain audio signal.

13. The method according to claim 11, further comprising receiving additional information indicative of the mask as the bitstream, wherein the neural network is conditioned on said additional information.

14. The method according to claim 11, wherein the latent feature space representation of the perceptual domain audio signal and/or the information indicative of the mask are received in quantized form; and wherein the method further comprises inverse quantization prior to inputting the latent feature space representation into the neural network.

15. The method according to claim 11, wherein generating the perceptual domain audio signal by the neural network is performed in a time domain; and/or wherein converting the perceptual domain audio signal to the original signal domain is performed in a frequency domain.

16. A method (e.g., computer-implemented method) of processing an audio signal using a neural network, wherein the method includes the steps of:

(a) obtaining a perceptual domain audio signal;

(b) inputting the perceptual domain audio signal into the neural network for processing the perceptual domain audio signal;

(c) obtaining, as an output from the neural network, a processed perceptual domain audio signal; and (d) converting the processed perceptual domain audio signal to an original signal domain based on a mask indicating masking thresholds derived from a psychoacoustic model.

17. The method according to claim 16, wherein processing the perceptual domain audio signal by the neural network is performed in a time domain.

18. The method according to claim 16, wherein the method further includes, before step (d), converting the audio signal to a frequency domain.

19. The method according to claim 16, wherein the neural network is conditioned on information indicative of the mask and/or conditioned on the perceptual domain audio signal.

20. The method according to claim 19, wherein processing the perceptual domain audio signal by the neural network includes predicting the processed perceptual domain audio signal across time and/or frequency.

21. The method according to claim 16, wherein the perceptual domain audio signal is obtained from:

(a) converting an audio signal from the original signal domain to the perceptual domain by applying the mask;

(b) encoding the perceptual domain audio signal; and (c) decoding the perceptual domain audio signal.

22. The method according to claim 21, wherein quantization is applied to the perceptual domain audio signal prior to encoding and inverse quantization is applied to the perceptual domain audio signal after decoding.

\* \* \* \* \*